United States Patent
Kikuchi

(10) Patent No.: US 6,446,132 B1
(45) Date of Patent: Sep. 3, 2002

(54) RADIO DATA COMMUNICATION SYSTEM AND METHOD FOR CARRYING OUT DATA COMMUNICATION THROUGH A RADIO CHANNEL

(75) Inventor: Tsuneyuki Kikuchi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/301,190

(22) Filed: Apr. 28, 1999

(30) Foreign Application Priority Data

Apr. 28, 1998 (JP) .......................................... 10-119421

(51) Int. Cl.[7] .............................................. G06F 15/173
(52) U.S. Cl. ........................ 709/239; 709/232; 455/445
(58) Field of Search ................................ 709/203, 227, 709/232, 239; 455/445; 714/4

(56) References Cited

U.S. PATENT DOCUMENTS 6,173,184 B1 * 1/2001 Kikuchi et al. ............. 455/445

FOREIGN PATENT DOCUMENTS

JP        8-279890        10/1996

* cited by examiner

*Primary Examiner*—John A. Follansbee
(74) *Attorney, Agent, or Firm*—Dickstein, Shapiro, Morin & Oshinsky LLP

(57) ABSTRACT

In a radio communication system for transmitting data transmission through a current path between a radio client terminal and an information server connected to a wire communication network, the current path is switched to an alternative path which is connected to another information server by comparing each transmission time through the current and the alternative path with each other, when the transmission time through the alternative path is shorter than that through the current path. Such a path switching may be carried out under control of a management server.

33 Claims, 16 Drawing Sheets

| CONTROL COMMAND NAMES | COMMAND ID VALUES |
|---|---|
| OPEN REQUEST | 0 × 01 |
| OPEN RESPONSE | 0 × 11 |
| OPEN CONFIRMATION | 0 × 21 |
| CLOSE REQUEST | 0 × 02 |
| CLOSE RESPONSE | 0 × 12 |
| DATA TRANSMISSION | 0 × 04 |
| DATA TRANSMISSION RESPONSE | 0 × 14 |
| DATA RETRANSMISSION RESPONSE | 0 × 24 |
| QUERY REQUEST | 0 × 08 |
| QUERY RESPONSE | 0 × 18 |

FIG.6

RADIO DATA COMMUNICATION SYSTEM AND METHOD FOR CARRYING OUT DATA COMMUNICATION THROUGH A RADIO CHANNEL

BACKGROUND OF THE INVENTION

This invention relates to a radio data communication system and method for use in carrying out data communication between a radio client terminal (will be simply called a client terminal hereinafter) and an information server through a radio communication network and a wire communication network, such as a public communication network. This invention also relates to the client terminal used in the radio data communication network.

It is a recent trend that radio communication has become popular and has been carried out by the use of a PHS (Personal Handy-phone System), a PDC (Personal Digital Cellular System), or the like. Moreover, such radio communication also tends to be utilized for data transmission which may transmit electronic mail (E-Mail) and which may access WWW servers. Under the circumstances, the communication environment has been ready for such radio communication by the use of a radio data communication protocol, such as PIAFS (PHS Internet Access Forum Standard) or a wire data communication protocol, such as TCP (Transmission Control Protocol). At any rate, compensation has been given about transmission errors which occur in a radio communication network and about data collision which occur in a wire communication network by the radio data communication protocol and the wire data communication protocol. As a result, data transmission can be certainly guaranteed between client servers.

Heretofore, proposal has been made in Japanese Unexamined Patent Publication (JP-A) No. Hei 8-279890, namely, 279890/1996 about a data communication device which can be used in the radio data communication network. With this data communication device, stable communication can be realized by avoiding failure, retransmission, and interruption of data all of which frequently take place during radio communication.

Thus, the data communication device mentioned above can accomplish data communication through the radio communication network and the wire communication network. Specifically, it is possible for the data communication device to realize effective data communication by changing parameters during the radio communication to optimum parameters which are suitable for the radio communication network. For example, increases have been indicated during the radio communication about various values of timers and about retransmission times of commands. This results in a reduction of communication errors.

Herein, it is to be noted that communication may not always be forcibly established on bad communication conditions, such as strong fading condition, low field intensity, in the radio communication network and a heavy load imposed on a server in the wire communication network. This is because such forcible communication under the bad conditions makes a communication time unexpectedly long and consequently gives rise to an undesirable increase of a communication charge.

SUMMARY OF THE INVENTION

It is an object of this invention to provide a radio communication system which is capable of shortening a communication time when the communication environment is bad in a radio communication network.

It is another object of this invention to provide a radio communication system of the type described, which is capable of reducing a communication charge and which is capable of realizing reliable data communication.

It is still another object of this invention to provide a client terminal which can be used in the radio communication system mentioned above.

According to an aspect of this invention, a radio communication method is for use in carrying out data communication between a radio terminal and a server and comprises establishing a path between the radio terminal and the server to carry out the data communication, measuring an amount of information left in the radio terminal at a predetermined time instant during the data communication after the path is established, and determining in the radio terminal whether or not the path is switched to an alternative path connected to an alternative server, with reference to the amount of information left in the radio terminal.

The predetermined time instant may be determined after a predetermined amount of information is transmitted through the path established between the radio terminal and the server or may be determined after failure of the information is detected by the server.

The above-mentioned determining comprises receiving, by the radio terminal, alternative information concerned with the alternative path from the server, calculating a transmission time necessary for transmitting the amount of information left in the radio terminal through the path, calculating, on the basis of the alternative information, an alternative transmission time necessary for a total amount of the information from the beginning, comparing the transmission time with the alternative transmission time to select a shorter one of the transmission time and the alternative transmission time, and deciding either one of the path and the alternative path that corresponds to the shorter one of the transmission time and the alternative transmission time.

According to another aspect of this invention, a radio data communication system is for use in carrying out data communication between a radio terminal and a server. The radio terminal comprises establishing means for establishing a path between the radio terminal and the server to carry out the data communication, measuring means for measuring an amount of information left in the radio terminal at a predetermined time instant during the data communication after the path is established, and determining means for determining whether or not the path is switched to an alternative path connected to an alternative server, with reference to the amount of information left in the radio terminal. The determining means may comprise means for receiving alternative information concerned with the alternative path from the server, means for calculating a selected one of a transmission time and a communication charge which are necessary for transmitting the amount of information left in the radio terminal through the path, means for calculating, on the basis of the alternative information, a selected one of an alternative transmission time and alternative communication charge which are necessary for a total amount of the information from the beginning, and means for comparing the selected one of the transmission time and the communication charge with the selected one of the alternative transmission time and the alternative communication charge to select either one of the path and the alternative path.

BRIEF DESCRIPTION OF THE DRAWING

FIG. 6 exemplifies control commands arranged in the data format illustrated in FIG. 5;

DESCRIPTION OF THE PREFERRED EMBODIMENTS

Figure 1:
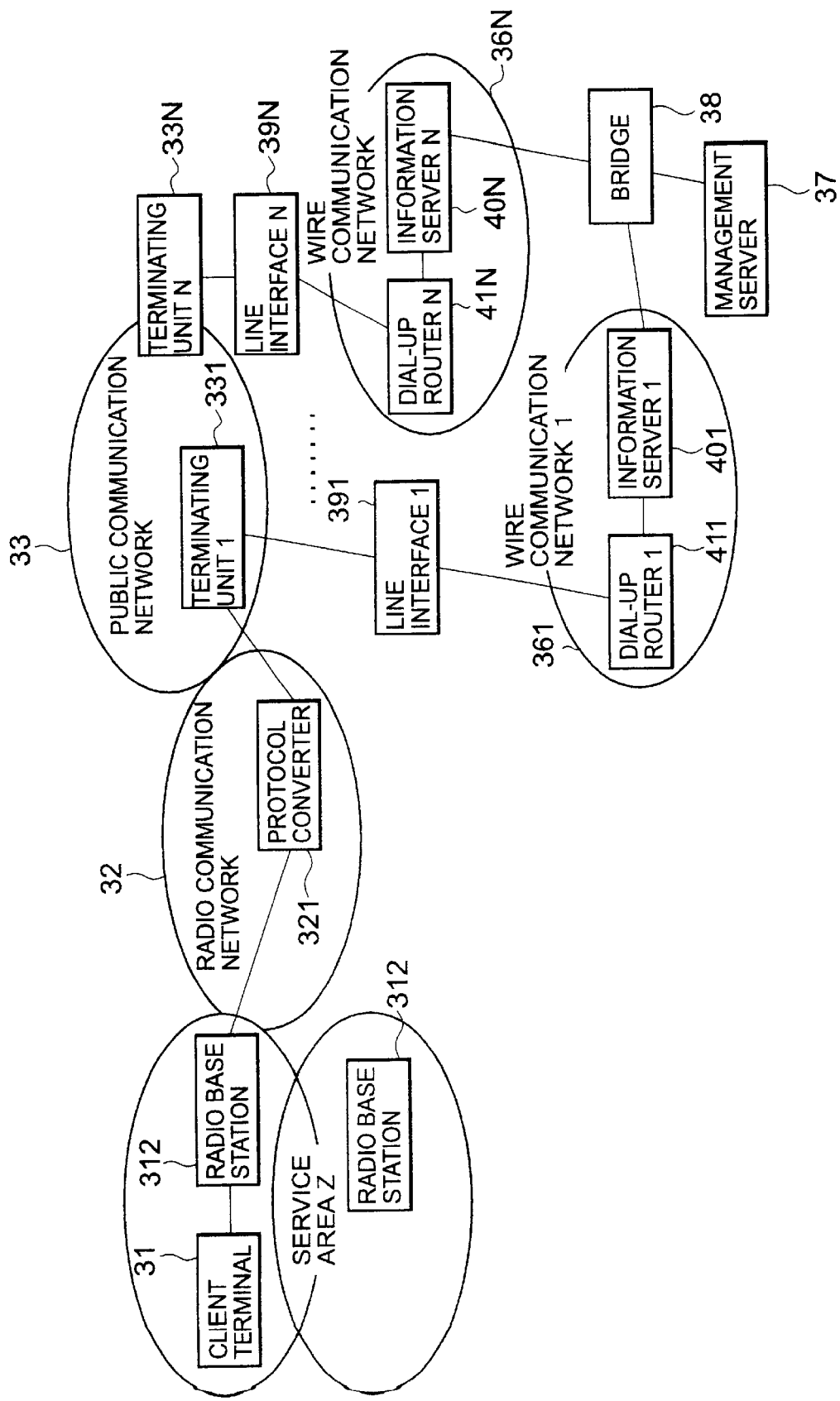
FIG. 1 shows a block diagram of a radio communication system according to this invention.

Referring to FIG. 1, a radio data communication system to which this invention is applicable includes a radio portable terminal 31 (hereinafter a client terminal), a plurality of radio communication networks 32, a public communication network 33, first through N-th wire communication networks 361 to 36N, and a management server 37 connected to the wire communication networks 361 through 36N via a bridge 38.

The illustrated client terminal 31 communicates with a radio base station 312 within a service area Z through a portable handy-phone system (PHS), a personal digital cellular system (PDC), or the like. The client terminal 31 may execute data communication in a plurality of modes which correspond to a plurality of radio communication systems, such as PHS, PDS, etc. Preferably, the client terminal 31 communicates with the radio base station 312, through a single one of the radio communication networks. In FIG. 1, the illustrated client terminal 31 may execute data communication through either one of the radio communication systems.

When a connection is established between the client terminal 31 and the radio base station 312 through a radio channel within the service area Z, the illustrated base station 312 communicates with the client terminal 31 in accordance with each of the systems selected by the client terminal 31 by judging a header of a packet sent from the client terminal 31. Such a selective operation of the base station 312 is known in the art and will not be described in detail herein.

In FIG. 1, the base station 312 is coupled to a protocol converter 321 which is included in the radio communication network 32 and which is also coupled to the public communication network 33. The protocol converter 321 is operable to execute data conversion of a data sequence between the radio communication network 32 and the public communication network 33 in compliance with each network protocol.

Herein, the public communication network 33 may be, for example, a public switched telephone network (PSTN), an integrated services digital network (ISDN), and the like. At any rate, the public communication network 33 includes a plurality of line terminating units, such as digital service units (DSU), which may be equal in number to N and which may be called first through N-th terminating units 331 to 33N. The first through the N-th terminating units 331 to 33N are connected through line interfaces 391 to 39N, such as terminal adapters, MODEMs, to the first through the N-th wire communication networks 361 to 36N, respectively.

The first through the N-th wire communication networks 361 to 36N include first through N-th information servers 401 to 40N connected to the line interfaces 391 to 39N through dial-up routers 411 to 41N, respectively, and may form local area networks (LANs). Each of the first through the N-th wire communication networks 361 to 36N is operable as a network segment different from one another while each of the information servers 401 to 40N in the wire communication networks 361 to 36N is connected to the management server 37 through the bridge 38 to be managed by the management server 37.

In the above-mentioned system, it is surmised that data communication is guaranteed between the client terminal 31 and the line interface 391 in accordance with a radio communication protocol, such as PIAFS (PHS Internet Access Forum Standard) protocol, and is also guaranteed between the client terminal 31 and the other line interface 39N in accordance with any other radio communication protocol.

Figure 2:
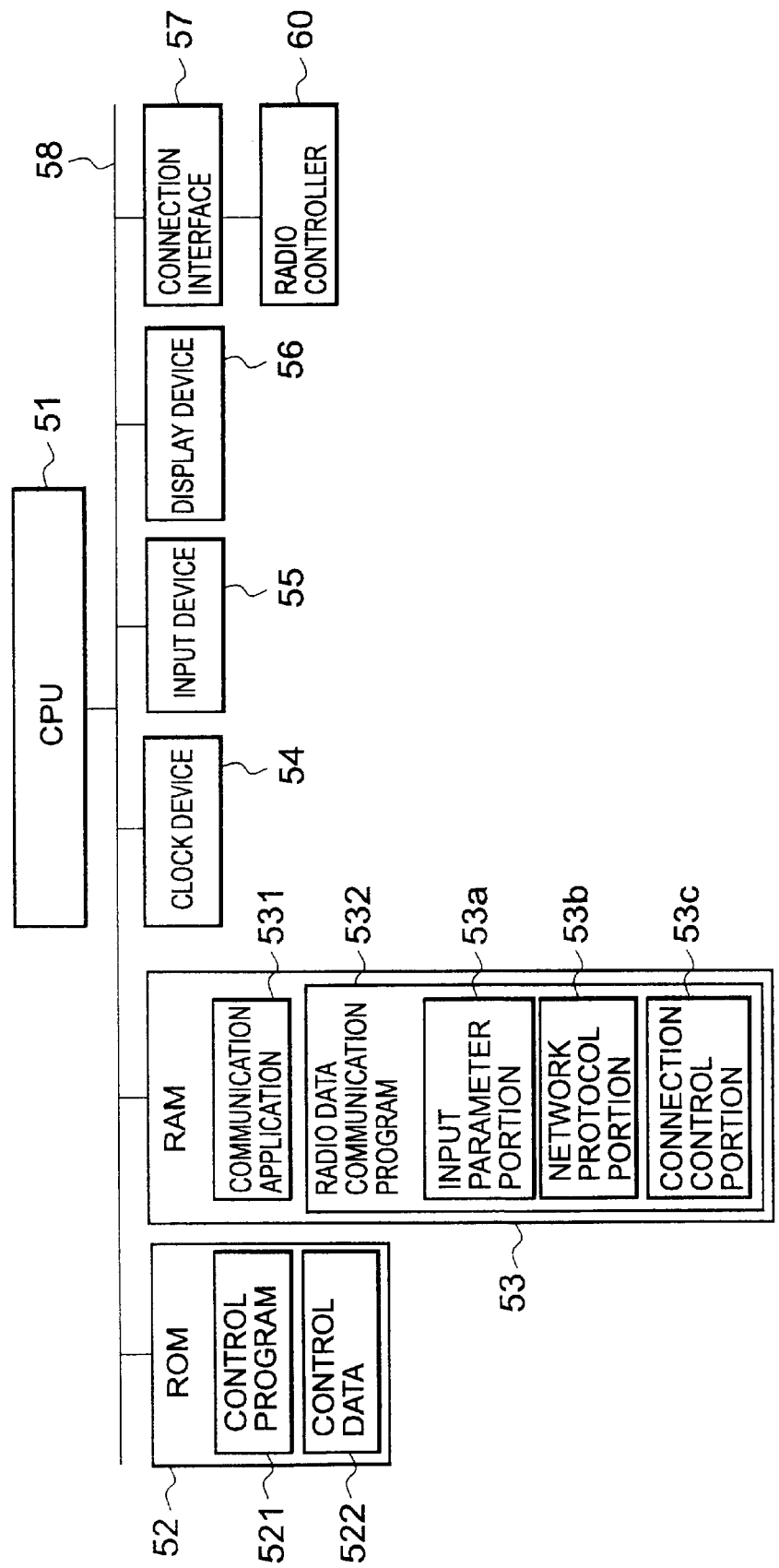
FIG. 2 shows a block diagram of a client terminal used in the radio communication system illustrated in FIG. 1.

Referring to FIG. 2, the client terminal 31 illustrated in FIG. 1 includes a central processing unit (CPU) 51, a read-only memory (ROM) 52, a random access memory (RAM) 53, a clock device 54, an input device 55, a display device 56, and a connection interface 57, all of which are connected to the CPU 51 through a bus 58. The illustrated bus 58 is assumed to be formed by a common data bus line and a common control bus line. As a result, the CPU 51 controls the remaining elements illustrated in FIG. 2.

Furthermore, the client terminal 31 has a radio controller 60 which is connected to the bus 58 through the connection interface 57 and which serves to establish a radio path or a radio channel between the client terminal 31 and the radio base station 312 (FIG. 1) and to monitor a current radio channel. In the illustrated example, the ROM 52 stores a control program 521, such as BIOS (Basic Input-Output System), and control data 522. On the other hand, the RAM 53 temporarily or permanently stores various kinds of data and programs. Specifically, the illustrated RAM 53 stores a communication application 531 and a radio data communication program 532. The radio data communication program 532 is divided into an input parameter portion 53a, a network protocol portion 53b, and a connection control portion 53c. In the radio data communication program 532, the input parameter portion 53a is started to be executed when a power source of the client terminal 31 is turned on. As a result, control parameters set by a user are given to the network protocol portion 53b and the connection control portion 53c. The network protocol portion 53b is operable in response to a path or channel switching request (will be described later) and judges from a remaining data size or amount whether or not a current path is to be switched. The connection control portion 53c informs the radio controller 60 of connection/disconnection of the channel. In addition, the communication application 531 notifies the network protocol portion 53b of a size of the total data to be transmitted and serves to receive/transmit information from/to each information server.

Figure 3:
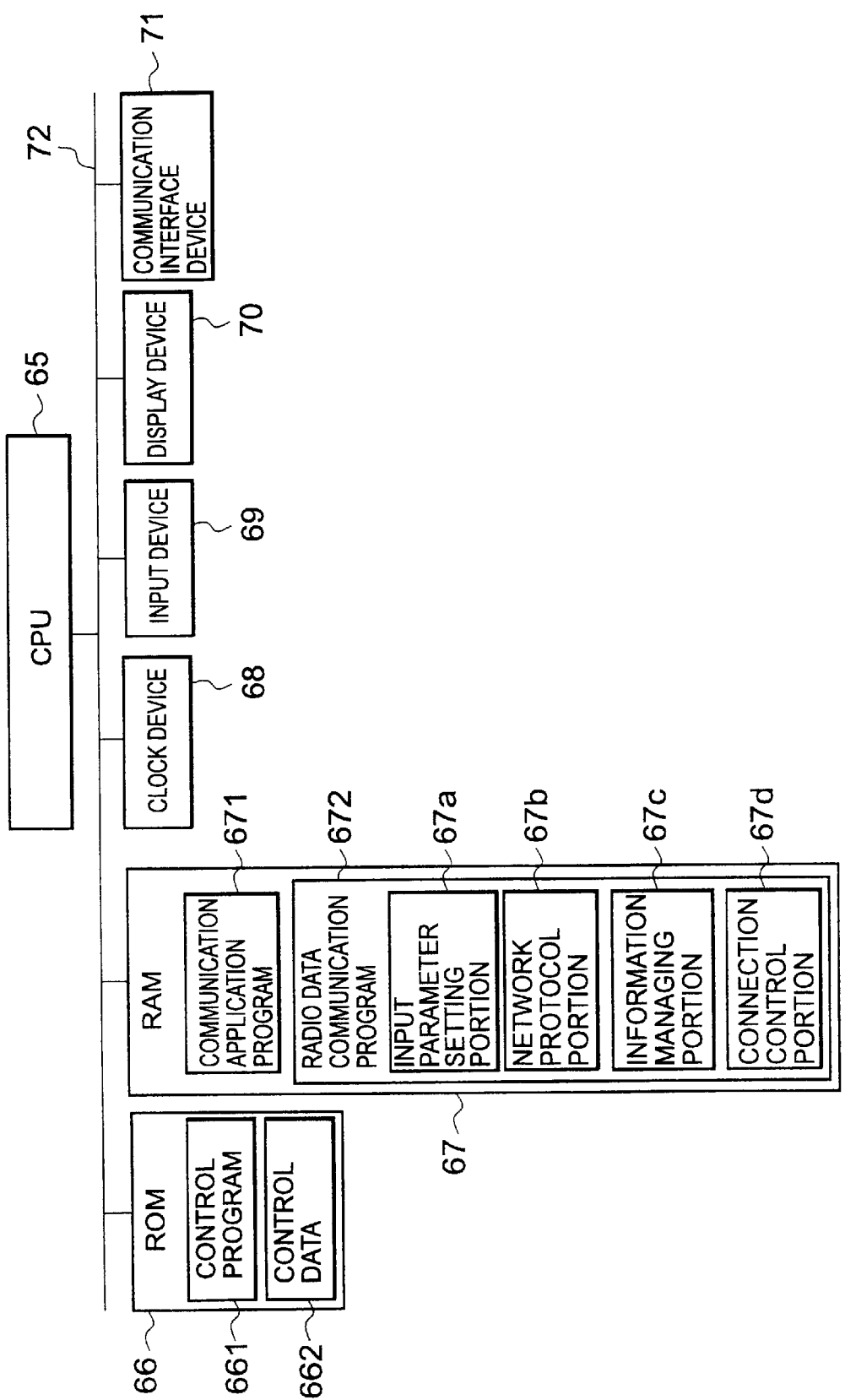
FIG. 3 shows a block diagram of an information server used in the radio communication system illustrated in FIG. 1.

Referring to FIG. 3, an information server will be exemplified which includes a central processing unit (CPU) 65 for controlling entirely of operation, a read-only memory (ROM) 66 for memorizing a control program 661 and a control data 662, and a random access memory (RAM) 67 for temporarily or permanently memorizing various kinds of information related to control of the CPU 65, a communication service program 671, and a radio data communication program 672. In addition, the information server further includes a clock device 68 for displaying a current time instant and/or measuring a time, an input device 69, such as a key board, a display device 70 for displaying status and operation procedure of the information server, and a communication interface 71 for transferring control commands and data. The above-mentioned elements are all connected to a bus 72 formed by a common data bus and a control bus.

The radio data communication program 672 is executed in the illustrated information server when a power source is turned on. Specifically, the radio data communication program 672 has an input parameter setting portion 67a, a network protocol portion 67b, an information managing portion 67c, and a connection control portion 67d. At the beginning of execution of the radio data communication program 672, the input parameter setting portion 67a delivers control parameters set by a network manager to both the network protocol portion 67b and the connection control portion 67d. The network protocol portion 67b monitors a re-transmission time of data to request a change of a connection to the client terminal in consideration of the re-transmission time while the information managing portion 67c transfers information between the illustrated information server and the management server 67 (FIG. 1). In addition, the connection control portion 67d is operable in response to a connection/disconnection request from the manager or the communication service program 671 to carry out connection or disconnection processing.

Figure 4:
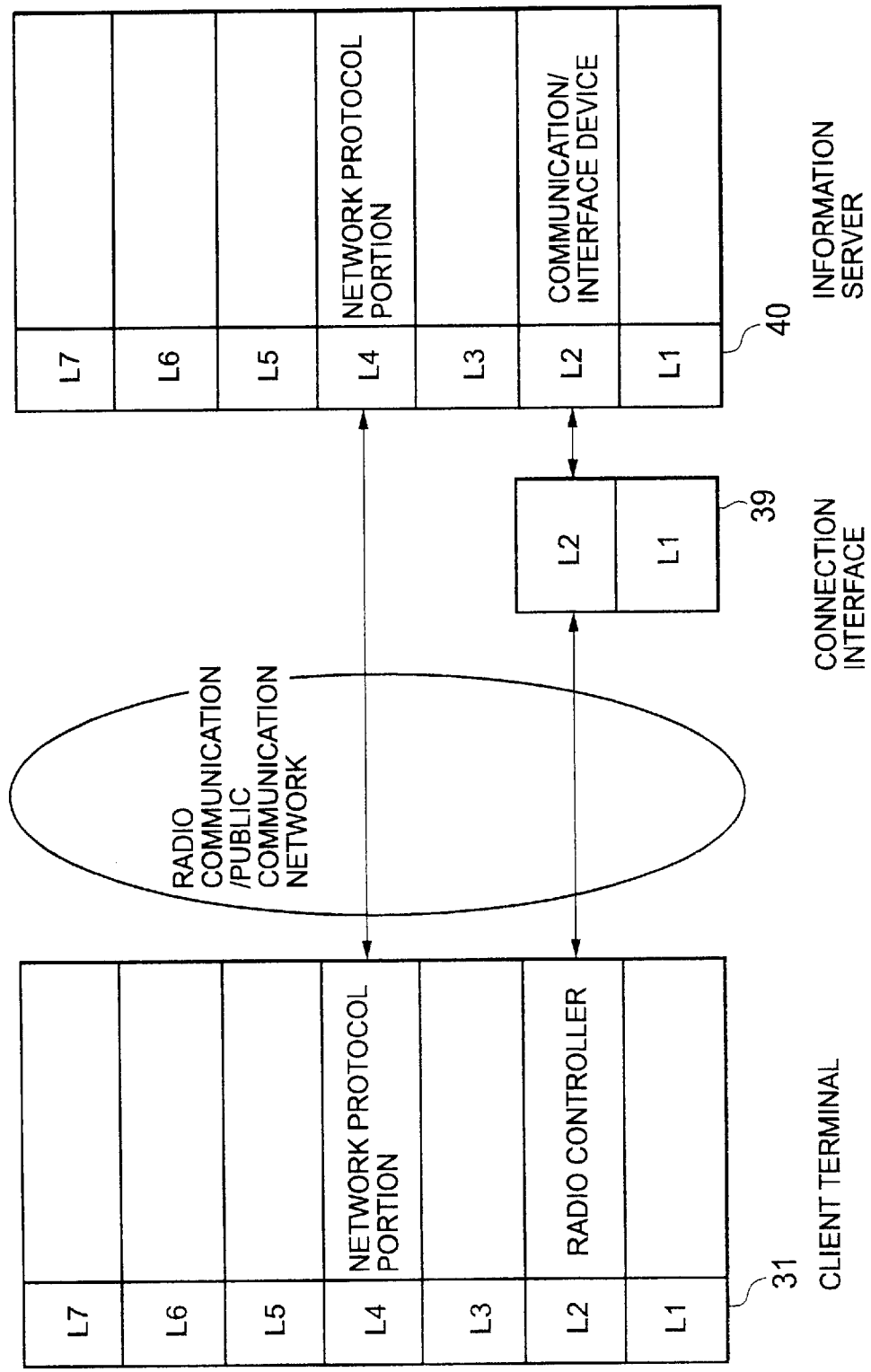
FIG. 4 shows a conceptual diagram for use in describing a relationship between a protocol (OSI) model and a data communication method according to this invention.

Referring to FIG. 4, description will be made about a protocol OSI (Open Systems Interconnection) model of seven layers L1 to L7 and about a concept of a radio data communication method and device according to this invention. In the radio data communication device according to this invention, data communication between the radio controller 60 (FIG. 2) and the connection interface 39 (FIG. 1) is guaranteed in accordance with the radio communication protocol 672 and, likewise, data communication between the client terminal 31 and the information server 40 is guaranteed in accordance with a network protocol portion, such as TCP. Herein, it is to be noted that a heavy load is imposed on the information server as connections to the information server increase and gradually brings about a reduction of throughput processed by the use of the protocol with an increase of the load.

On the other hand, data compensation in the radio communication protocol is carried out, for example, in PIAFS, by using SR-ARQ (Selective Repeat-Automatic Repeat reQuest) method of repeating only a frame which can not be received.

Hereinafter, it is assumed in the following description that a UDP (User Datagram Protocol) is used as the network protocol (detailed in RFC768) so as to locate control data at a head of the data transferred between the network protocol portion 53b of the client terminal 31 and the network protocol portion 67b of the information server. Thus, the radio communication can be executed between the client terminal 31 and the information server. However, the UDP may be replaced by the TCP.

Figure 5:
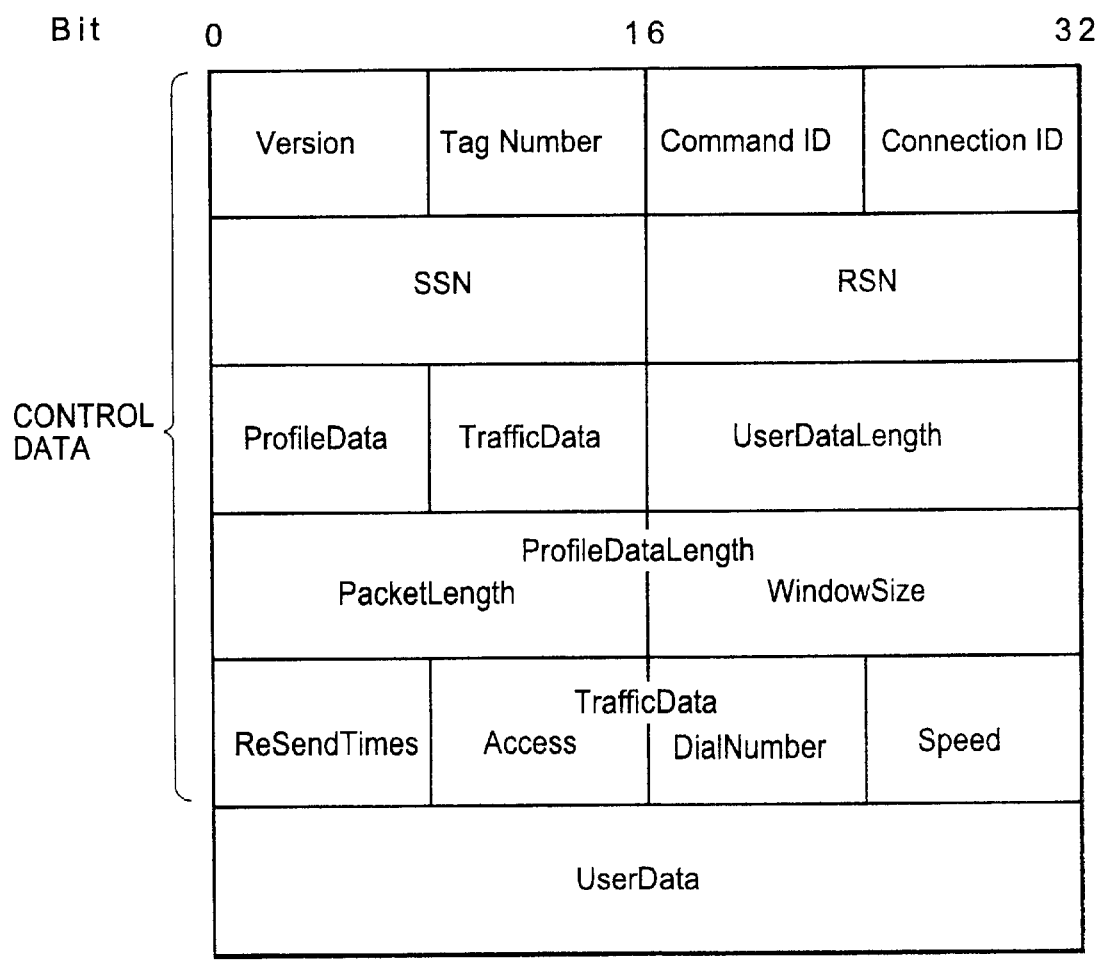
FIG. 5 shows a data format of control data used in this invention.

Referring to FIG. 5, illustration is exemplified about a control data format. In FIG. 5, the illustrated control format has a version area, a tag number area, a command ID area, a connection ID area, an SSN (sending sequence number), an RSN (receiving sequence number) area, a profile data area, a traffic data area, a user data length area, a profile data length area, a re-send times area, a traffic data area, a speed area, and a user data area. Specifically, the version area is for arranging a version of the control data format while the tag number area is for arranging a provisional number kept until a connection ID is sent from the information server. The above-mentioned areas form a control data field.

Referring to FIG. 6 together with FIG. 5, the command ID area is for arranging control commands which are represented by control command ID values illustrated in FIG. 6. Each of the control commands includes an open request, an open response, an open confirmation, and so on and is specified by a hexadecimal number value, as shown in FIG. 6.

Referring back to FIG. 5, the SSN area is for arranging a transmission data sequence number representative of a sequence number of data to be transmitted, the RSN area is for arranging a reception data sequence number representative of a sequence number of data received. In addition, the profile data area is for locating information representative of absence or presence of the profile data and the traffic data area is for locating information representative of absence or presence of the traffic data.

Furthermore, the user data length area is for arranging a user data length while the profile data length area is for arranging a profile data length, the profile data length area is divided into a packet length area for arranging a maximum size which appears on dividing the data received/transmitted and a window size representative of a packet number which can be continuously transmitted without waiting for any response from a transmitted side. The resent times area is for arranging re-send times, namely, a frequency of re-send occurrence with a predetermined time interval while the access area is for locating the number of client terminals which make access to the information server while the dial number area is for locating a connection number of the other information server to be switched while the speed area is for arranging a prediction transmission/reception data speed or rate of the switched connection.

Figure 7:
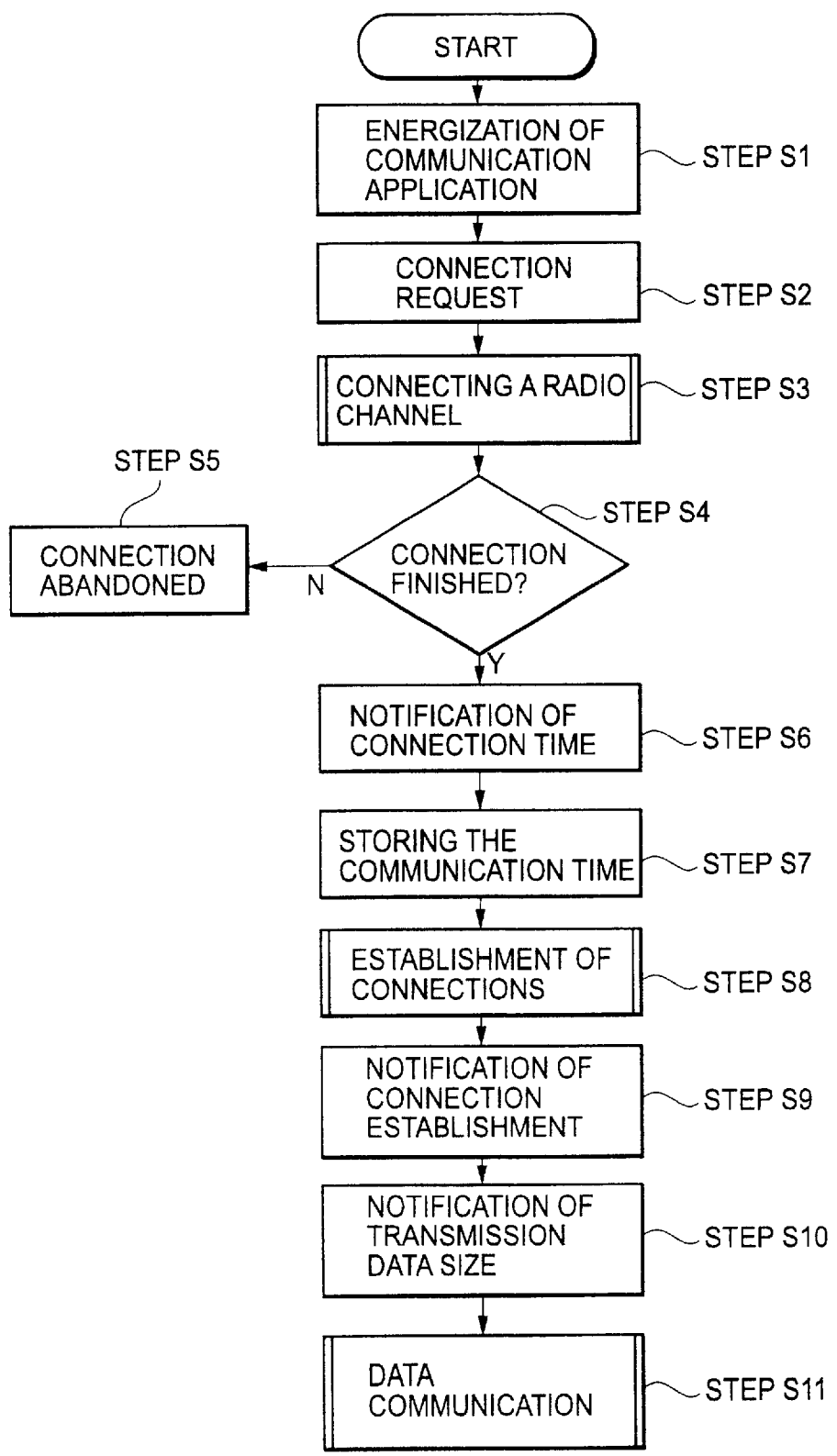
FIG. 7 shows a flow chart for use in describing operation of the client terminal illustrated in FIG. 2.

Referring to FIG. 7 afresh, description will be made about operation from establishment of a radio connection to transmission/reception of data.

In FIG. 7, when the communication application 531 of the client terminal 31 is energized by the user to select transmission data (step S1), a connection request is sent to the connection control portion 53c (step S2). Supplied with the connection request, the connection control portion 53c proceeds to a step S3 of connecting a radio channel. The step S3 will be described later in detail and is followed by a step S4 of judging whether or not a connection of the radio channel is finished.

If the connection is not finished, the step S4 is succeeded by a step S5. Otherwise, the step S4 is followed by a step S6. At the step S5, the connection control portion 53c informs the communication application 531 of no seizure of any radio channel to make the communication application 531 notify the user of no seizure of any radio channel. As a result, the connection is stopped.

At the step S6, the connection control portion 53c informs the network protocol portion 53b of a time interval, namely, a connection time which is necessary until the connection is finished.

The network protocol portion 53b illustrated in FIG. 2 stores the connection time at a step S7 and thereafter proceeds to a step S8 of establishing the connection to the network protocol portion 67b of the information server. Such a connection may be called a connection to the information server for brevity of description while the step S8 will be mentioned hereinafter in detail.

After the connection is established, the network protocol portion 53b of the client terminal 31 informs the communication application 531 of the connection establishment at a step 59. The communication application 531 notifies, the network protocol portion 53b of a total amount of transmission data, namely, a transmission data size (step S10) and starts data communication to the information server under control of the network protocol portion 53b (step S11).

Figure 8:
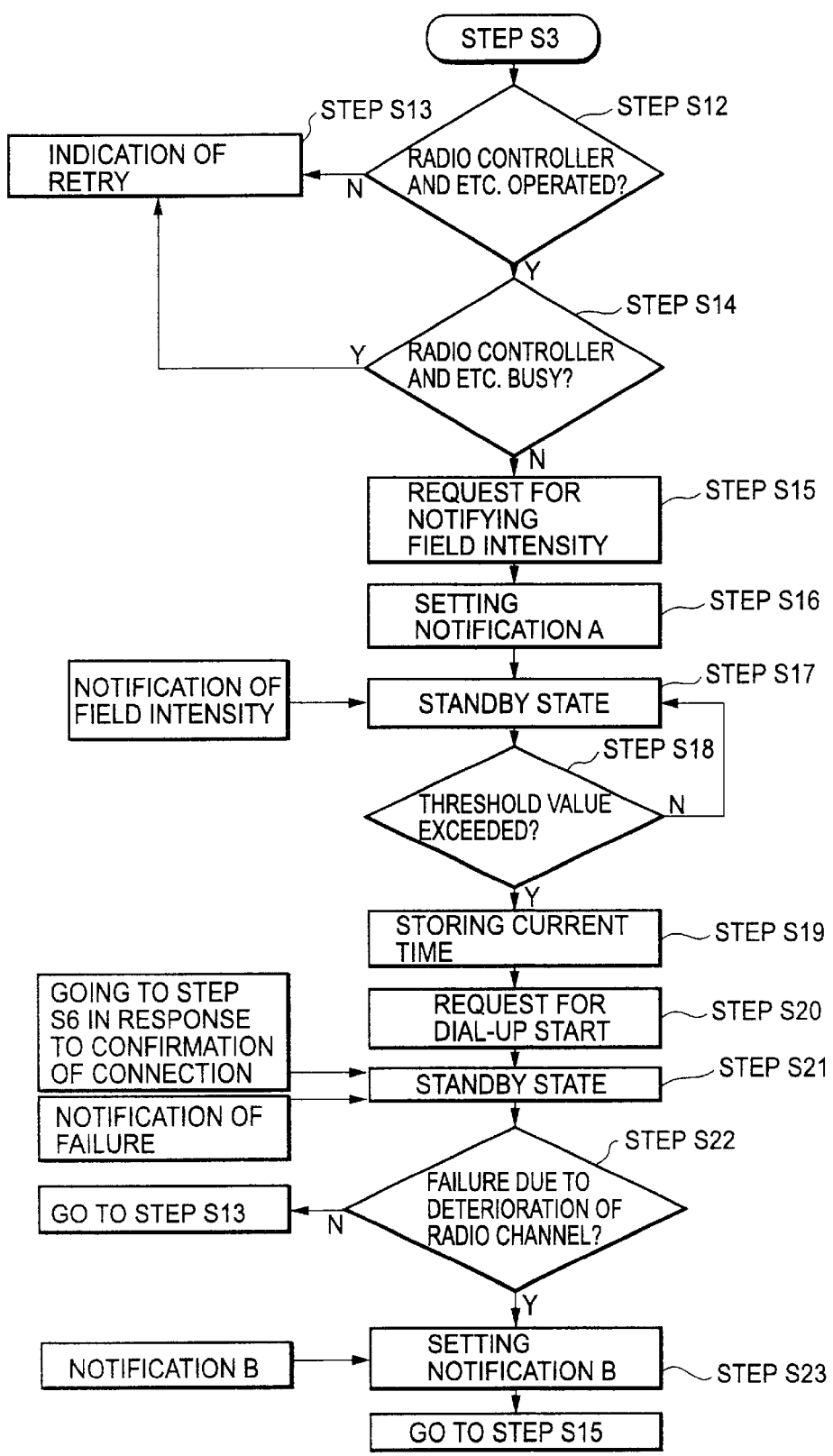
FIG. 8 shows a flow chart for use in describing a specific step illustrated in FIG. 7 in detail.

Referring to FIG. 8 together with FIG. 7, the step S3 illustrated in FIG. 7 will be described in detail. At first, the step S3 is started and the connection control portion 53c makes sure whether or not the connection interface 57 and the radio controller 60 are normally operated (step S12). If both the connection interface 57 and the radio controller 60 are operated, the step S12 is followed by a step S13 of judging whether or not the connection interface 57 and the radio controller 60 are busy. Otherwise, the step S12 is succeeded by a step S14 at which the connection control portion 53c informs the communication application 531 that the connection interface 57 and the radio controller 60 are not operated and that a retry of the communication application 531 is indicated to the user.

When the connection interface 57 and the radio controller 60 are busy, the step S13 is returned back to the step S14 and, otherwise, is followed by a step S15.

At the step S15, a request is sent to the radio controller 60 so that field intensity is notified at every predetermined time interval. A notification A is set to the clock device 54 at a step S16 to be sent after a lapse of a time for judging whether or not the connection is possible. The step S16 proceeds to a step S17 to be kept at a standby state at which the field intensity is informed, as illustrated in FIG. 8. From this fact, it is readily understood that the notification A is sent from the clock device 54 when the field intensity is not produced within the predetermined time interval. In the above-mentioned example, the clock device 54 also produces notifications B to D other than the notification A, as will be mentioned after. At any rate, the notifications A to D are produced on interrupting a timer and serve as identifiers.

When the notification A is received from the clock device 54 during the standby state, the connection control portion 53c informs the communication application 531 that the radio channel can not be connected. As a result, the communication application 531 notifies the user of impossibility of the connection.

Responsive to the field intensity notification, the connection control portion 53c confirms at a step S18 whether or not the field intensity exceeds a threshold value determined for connection. As long as the field intensity does not exceed the threshold value, processing is returned back to the step S17 to be kept at the standby state. Otherwise, the step S18 is followed by a step S19 at which the connection control portion 53c gains and stores a dial-up start time from the clock device 54 and sends a request for starting the dial-up to the radio controller 60 (step S20). Thereafter, the connection control portion 53c is kept at a standby state at a step S21 to wait for a notification which is given from the radio controller 60. The notification is indicative of completion of the connection or failure of the connection.

When the connection control portion 53c receives the notification indicative of the completion of the connection during the standby state, a finished time of the dial-up is given from the clock device 54 to the connection control portion 53c. The connection control portion 53 c subtracts the dial-up start time from the finished time of the dial-up to calculate a connection time necessary for the connection and to send the connection time to the network protocol portion 53b (step S6 in FIG. 7).

On the other hand, when the failure of the connection is received, the connection control portion 53c detects a reason of the failure attached to the notification and judges whether or not the failure of the connection is based on degradation of the radio channel (step S22). If the failure of the connection is due to the degradation of the radio channel, the step S22 is followed by a step S23. Otherwise, the step S22 is returned back to the step S13.

At the step S23, the notification B is set into the clock device 54 to be produced after a lapse of a time for retry operation. Supplied with the notification B from the clock device 54, the connection control portion 53c returns its operation back to the step S15 to request the radio controller 60 to inform of the field intensity at the predetermined time interval.

The above-mentioned predetermined time interval, the time of judging whether or not the connection is possible, the threshold value for connection processing, and the time for carrying out the retry operation are sent from the input parameter portion 53a in the form of control parameters determined by the user.

Figure 9:
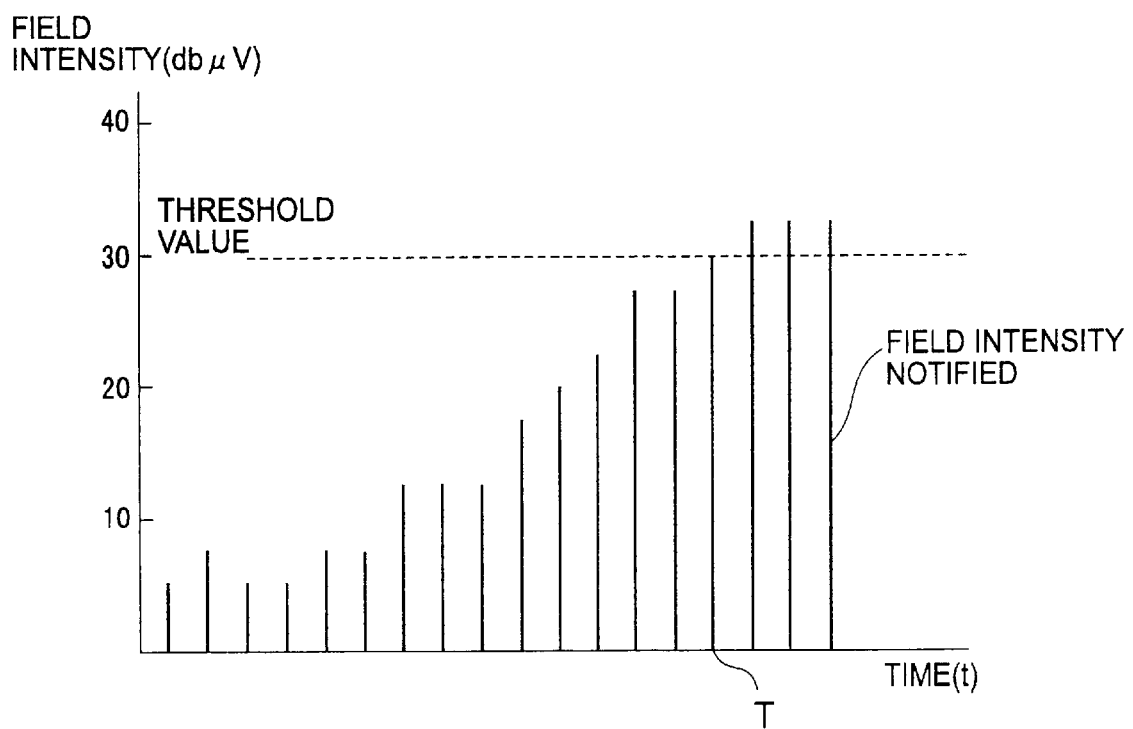
FIG. 9 shows a relationship between field intensity and a threshold value determined for connection.

Referring to FIG. 9, illustration is made about a relationship between the notified field intensity and the threshold value. In FIG. 9, the connection control portion 53c sends the dial-up start request to the radio controller 60 at a time instant T when the field intensity notified is equal to or greater than the threshold value TH. Thereafter, the connection control portion 53c proceeds to the step of confirming the connection. When the connection interface between the connection control portion 53c and the radio controller 60 depends on the radio controller 60, the connection control portion 53 may have a structure which can be switched in accordance with a species of the radio controller 60.

Figure 10:
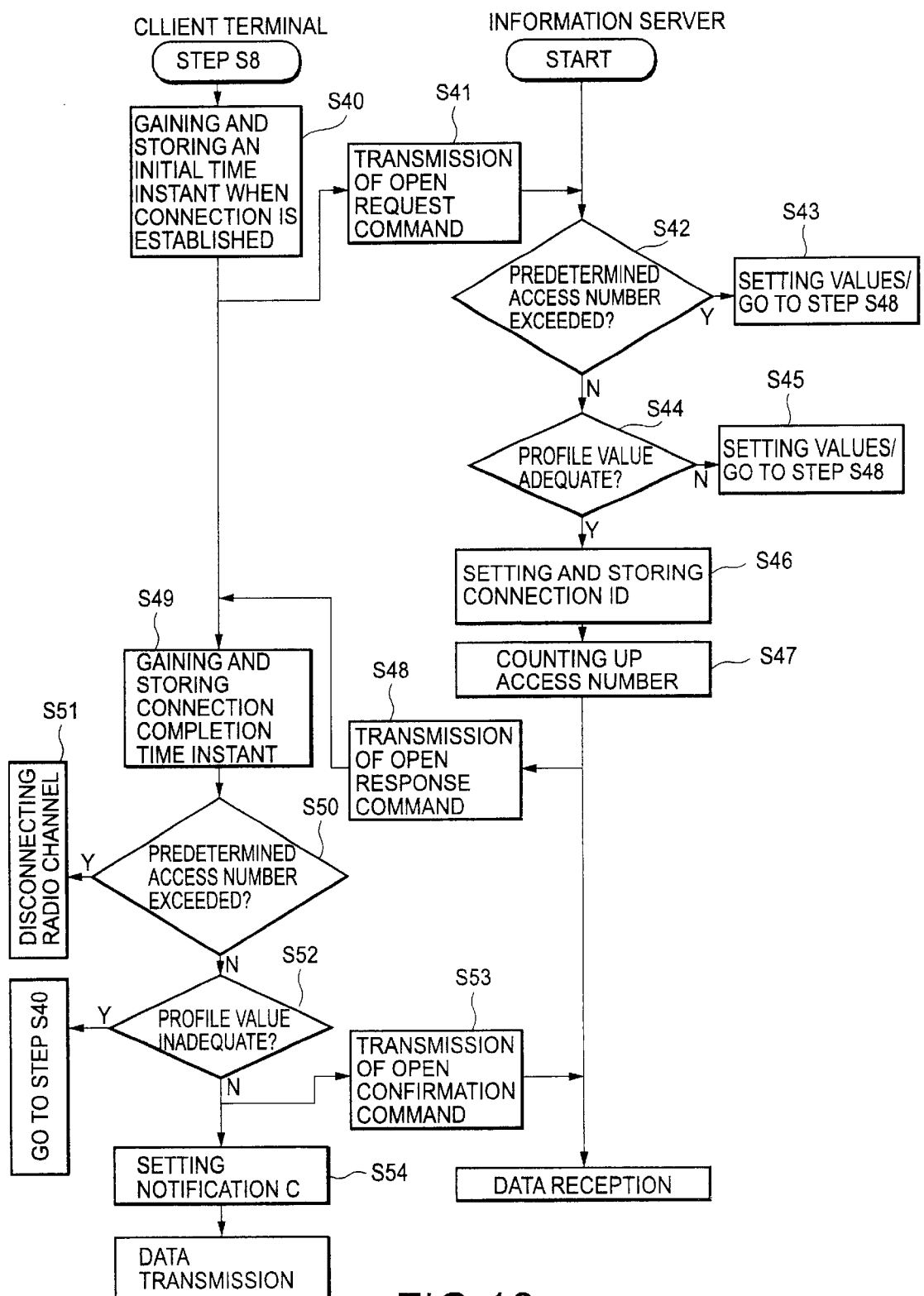
FIG. 10 shows a flow chart for use in describing a part of the operation illustrated in FIG. 7 in connection with operation of the information server shown in FIG. 3.

Referring to FIG. 10, description will be made in detail about the step S8 of establishing a connection between the information server and the client terminal 31. In this connection, the step S8 executed in the client terminal 31 is illustrated in FIG. 10 in relation to an operation of the information server. The network protocol portion 53b of the client terminal 31 stores the connection time at the step S7 (FIG. 7) and stores an initial time instant when the connection is established (step S40). The initial time instant is given from the clock device 54 (FIG. 2). At a step S41, the open request command (shown in FIG. 6) is transmitted from the client server 31 to the information server. More specifically, the control data field illustrated in FIG. 5 is loaded with the open request command (0×01), the tag number unique to the system, a flag representative of the presence of the profile data, the maximum size determined on dividing the transmission/reception data, the packet number which can be continuously transmitted without waiting for any response from the other party, the profile data length, and the user data length. After the transmission of the open request command, the client terminal 31 waits for receiving the open response command from the information server.

In the control data field, the flag which is representative of the presence of the profiled data indicates that either the packet length or the window size is defined in the control data in question. This means that, when the flag is not set, the information server judges that optional values are set as the packet size of, for example, 1024, and the window size of, for example, 64. In addition, the tag number is indicative of a provisional identification number used until the connection is established between the client terminal 31 and the information server.

Supplied with the open request command from the client terminal 31, the information server makes sure whether or not the number (client access number) of the client terminals which access the information server in question reaches or exceeds a predetermined access number (step S42). If the client access number exceeds the predetermined access number, the step S42 is succeeded to a step S43. Otherwise, a step S44 follows the step S42 to nudge on the basis of the memory size of the information server whether or not the received profile value is adequate. If the received profile is adequate, the step S44 is followed by a step S46 and, otherwise, the step S44 is succeeded by a step S45.

At the step S46, a unique value determined for the system is set in the connection ID and is stored in the information server. Thereafter, the access number is counted up by one (step S47) and the open response command (0×11) is sent from the information server to the client terminal 31 (step S48).

When the client access number exceeds the predetermined access number (step S42), the step S43 is executed to set values into the connection ID and the tag number areas. In this case, the value in the connection ID area indicates that the client access number exceeds the predetermined access number while the value in the tag number area is given the tag number received from the client terminal 31. Subsequently, the step S43 proceeds to the step S48 to transmit the open response command to the client terminal 31.

When the above-mentioned step S45 follows the step S44, the connection ID area is given a value representative of the fact that an inadequate number is set as the profile value. In addition, the tag number received from the client terminal 31 is set in the tag number area while an adequate profile number is set as the profile value. Thereafter, the step S45 goes to the step S48 to transmit the open response command to the client terminal 31.

Supplied with the open response command from the information server, the network protocol portion 53b (FIG. 2) receives a connection completion time instant from the clock device 54 (step S49) and stores the time instant. At a step S50, the network protocol portion 53b monitors the control data field of the open response command received from the information server and judges at a step S50 whether or not the value in the connection ID area indicates that the client access number exceeds the predetermined access number. When the client access number exceeds the predetermined access number, a step S51 follows the step S50 to inform the user of no establishment of a connection and to inform the connection control portion 53c of disconnection of the radio channel. Otherwise, a step S52 is executed after the step S50 to judge whether or not the profile value is inadequate in the connection ID area. If the profile value is inadequate, processing is returned back to the step S40 mentioned before. On the other hand, if the profile value is adequate, the step S52 is followed by a step S53 at which an open confirmation command (0×21) is transmitted from the client terminal 31 to the information server. In this event, the open confirmation command has the connection ID area given the value received from the information server.

In addition, the step S52 is also followed by a step S54 at which the notification C is set in the clock device 54. Such a notification C is set into the clock device 54 to indicate that a notification is produced from the clock device 54 at the clock predetermined time interval to divide a packet (step S54). Furthermore, the notification which is indicative of the establishment of the connection is transmitted to the communication application 531 (step S9). Subsequently, data transmission is carried out between the client terminal 31 and the information server (step S11). In the above-mentioned description, the predetermined access number is one of control parameters determined by the information server manager while the value which specifies an inadequate value may be an identifier unique to the system.

Figure 11:
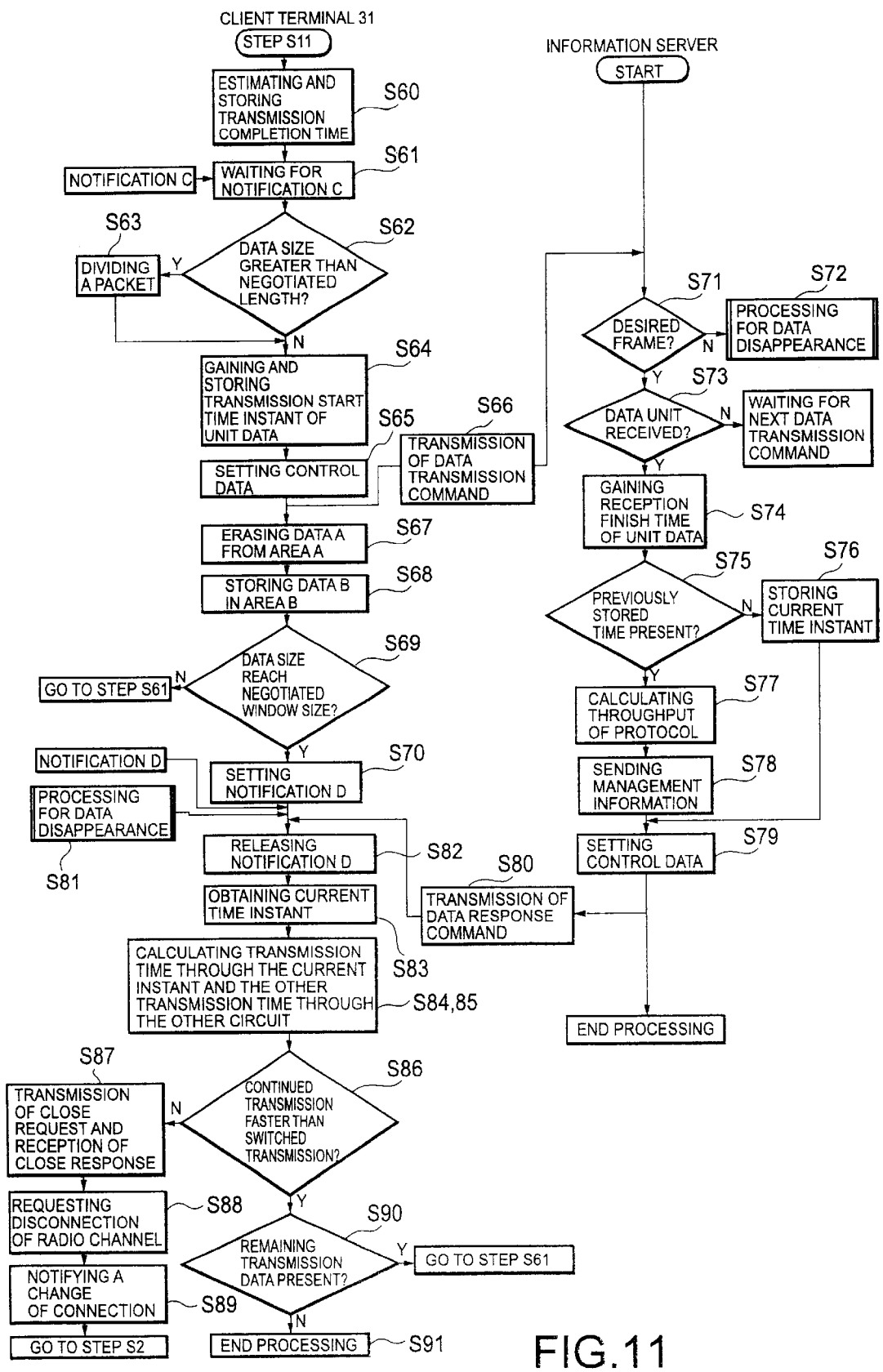
FIG. 11 shows a flow chart for use in describing another part of the operation illustrated in FIG. 7 in relation to operation of the information server.

Referring to FIG. 11, description will be made about the step S11 which is illustrated in FIG. 7 and which carries out data communication between the client terminal 31 and the information server. In FIG. 11 also, processing in the information server is illustrated along with processing in the client terminal 31. At first, the network protocol portion 53c of the client terminal 31 is given from the communication application 531 a total amount of data that is to be transmitted. At this time, the network protocol portion 53c is given the connection establishment start time instant and the connection establishment completion time instant obtained at the steps S40 and S49, respectively. Moreover, a first data amount transmitted with the open request command and a second data amount received with the open response command are transmitted to the network protocol portion 53c. Under the circumstances, the network protocol portion 53c estimates a transmission time taken until completion of the transmission with reference to the start and the completion time instants and the first and the second data amounts and stores an estimated transmission time (step S60). The transmission time is updated at each time when transmission of a unit data is finished.

Subsequently, a sequence of data is successively stored in a data memory area (depicted by A) of the RAM 53 under control of the communication application 531. In this state, the communication application 531 waits for the notification C sent from the clock device 54 (step S61). When the notification C is received from the clock device 54, judgement is made at a step S62 about whether or not the data size stored in the data memory area A is longer than a negotiated packet length which is determined by a result of negotiation with the information server (step S62).

If the data size stored in the data memory area A is longer than the negotiated packet length, the step S63 is executed to divide the data into a plurality of packets each of which has the negotiated packet length. At any rate, the steps S62 and S63 are followed by a step S64. At the step 64, the transmission time instant of the unit data is given from the clock device 54 to be stored. In addition, the step S64 serves to store the data transmission command (0×04) in the command ID area of the control data field (FIG. 5), the value received in the connection ID area on reception from the information server, the data sequence number in the SSN area to be transmitted, and the data length in the user data length area. The above-mentioned command, value, and sequence number are set in the respective areas at a step S65. Under the circumstances, the data transmission command is transmitted from the client terminal 31 to the information server at a step S66 and the transmitted data is erased from the area A at a step S67. At a step S68, the erased data is stored in a memory area B of the RAM 53. The step S68 is succeeded by a step S69 at which judgement is made about whether or not the number of the data frame continuously transmitted reaches the window size which is negotiated on the connection establishing process with the information server.

If the number of the data frame reaches the negotiated window size, the step S69 is followed by a step S70 which is for setting the clock device 54 into the notification D. Otherwise, the step S69 is returned back to the step S61. The above-mentioned notification D is operable to produce a notification after a lapse of a waiting time of the data response command sent from the information server. Thus, a waiting state is kept until the control command is transmitted from the information server.

On the other hand, the information server receives the data transmission command from the client terminal 31 at the step S66. In this event, the information server monitors the SSN area for the sequence data number and confirms whether or not the sequence data number specifies a desired frame (step S71). If the desired frame is not specified by the SSN area, the step S71 is followed by a step S72. Otherwise, the step S71 is succeeded by a step S73.

Herein, it is to be noted that when the desired frame is not specified by the SSN area, the data in question disappears or lacks during transmission. In this connection, the step S72 is for carrying out processing which is required on failure of any data in a manner to be described later.

At the step S73, the judgement is made about whether or not the unit data which is equal to the window size negotiated with the client terminal 31 on the connection establishing step is continuously received by the information server. If continuous reception of each unit data is judged, the step S73 is followed by a step S74. If not, the information server waits for a next following data transmission command.

At the step S74, the communication service program 671 (FIG. 3) is given a reception finish time instant of each unit data from the clock device 68 (FIG. 3) and judges whether or not a previously stored time instant is present (step S75). If the previously stored time instant is not present, the step S75 proceeds to a step S76. Otherwise, a step S77 follows the step S75.

At the step S76, the reception finish time instant is stored as a current time instant. On the other hand, the step S77 is for calculating throughput of the network protocol from an amount of data received between the previously stored time instant and the current time instant. The throughput is sent as management information to the management server 37 (FIG. 1) (step S78).

In any event, the steps S76 and S78 are followed by a step S79 at which control data is set. Specifically, the control data may be formed by the SSN value of the latest received data, a frequency of the re-send times occurring within a prescribed time interval, the number of client terminals accessing the information server, a path number of the other information server that can be connected instead of the information server in question, and a data transmission/reception data rate predicted from the path of the other information server. The SSN value, the frequency of the re-send times, the number of the client terminals, the path number, and the data rate are arranged in the SSN field, the re-send times area, the access area, the dial number area, and the speed area, respectively (FIG. 5).

After the control data is set as mentioned before, the information server transmits the data response command (0×14) to the client terminal 31 (step S80).

Responsive to the control data, the management server 37 transmits the path number of the other information server and the predicted data rate from the management server 37 to the other information server.

In FIG. 11, the notification D in the client terminal 31 is received by the network protocol portion 53b from the clock device 54 (FIG. 2) before reception of the data response command from the information server. In this case, the network protocol portion 53b executes processing required on failure of data (step S81), as will be described later.

On the other hand, when the data response command is received before reception of the notification D, a request for releasing or canceling the notification D is issued to the clock device 54 (step S82) and a transmission finish time instant of each unit data is given as a current time instant from the clock device 54 (step S83). Thus, the transmission start time instant of the unit data and the transmission finish time instant of the unit data are attained at the steps S64 and S83.

At a step S84, calculation is made about a time difference between the transmission finish time instant and the transmission start time instant and a remaining data amount left in the client terminal 31 without transmission. Thereafter, calculation is also made in the network protocol portion 53b about a transmission time which is necessary to continuously transmit all of the remaining data by using the currently connected path (step S85). In this connection, the data transmission through the currently connected path may be referred to as continued transmission. Moreover, calculation is also made at the step S85 about the other transmission time which is necessary for transmitting the whole data through the other path that is indicated by the information server to be switched. The other transmission time can be calculated with reference to the predicted data rate and a total amount of the data to be transmitted. The data transmission through the other path may be called switched transmission.

At a step S86, the transmission time is compared with the other transmission time to determine whether or not the continued transmission is faster than the switched transmission. If the continued transmission is not faster than the switched transmission, the step S86 is followed by a step S87 at which the close request command (0×02) (FIG. 5) is sent to the information server which is currently connected and which may be called a current information server. When the close response command (0×12) is received at the step S87, a step S88 is executed to require disconnection of the radio channel to the connection control portion 53c. After the disconnection of the radio channel is notified from the connection control portion 53c, a notification which is to be switched to the other path is given to the communication application 531 (step S89). Subsequently, processing is returned back to the step S2.

When the continued transmission is faster than the switched transmission, the step S86 is succeeded by a step S90 at which judgement is made about whether or not the remaining data is left in the client terminal 31 without transmission. If the remaining data is left, processing is returned back to the step S61 and, otherwise, end processing is executed in connection with data transmission (step S91).

Figure 12:
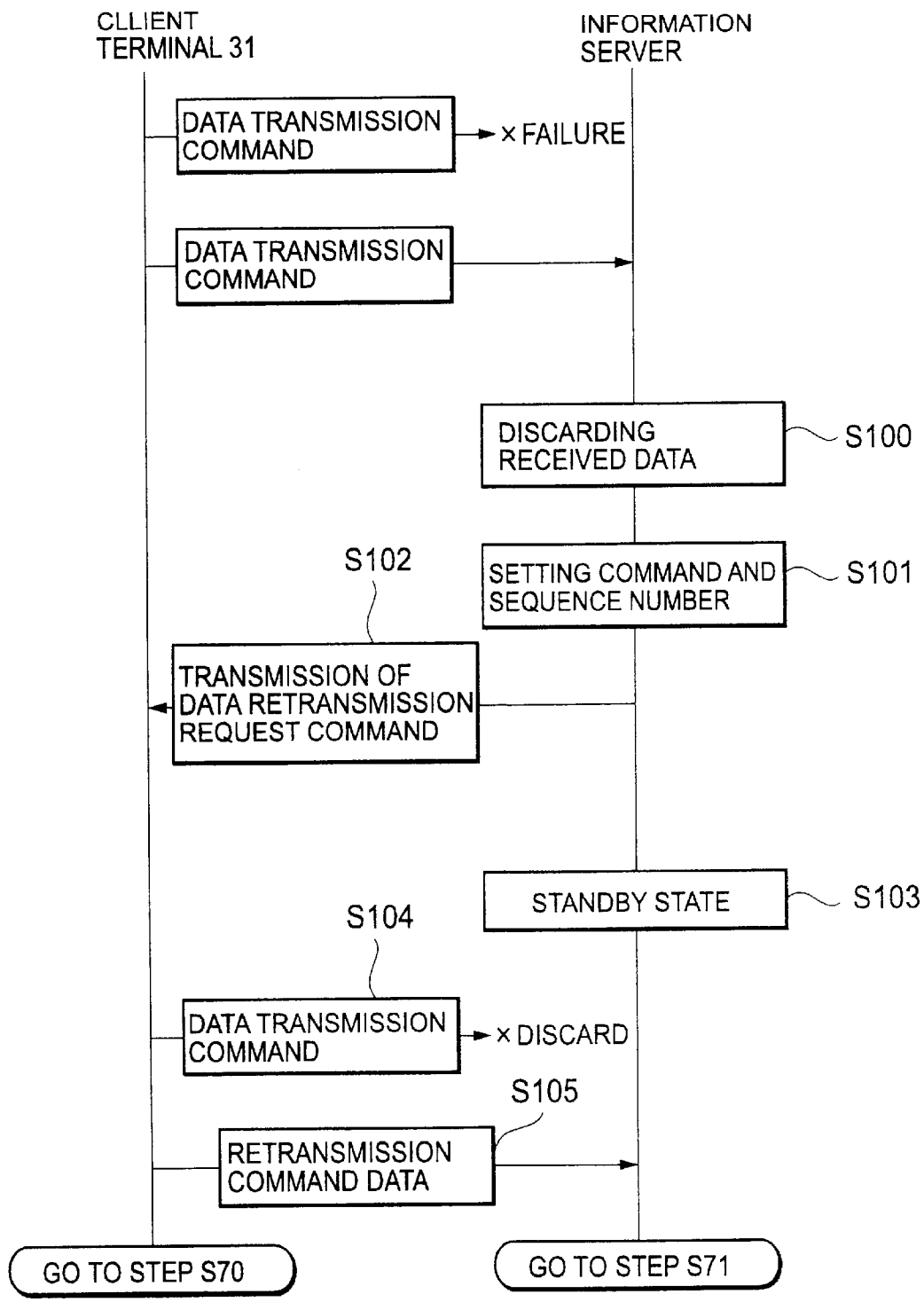
FIG. 12 shows a flow chart for use in describing operation carried out in the client terminal and the information server on occurrence of failure of a data transmission command sent from the client terminal.

Referring to FIG. 12, description will be made as regards the step S72 which is illustrated in FIG. 11 and which is carried out in the information server when the data transmission command disappears. In FIG. 12, let the data transmission command (0×04) disappear one time during the transmission and no desired frame be included in a second one of the data transmission command received by the information server. In this case, the information server discards the data received (step S100) and processes a step A101 to set a command and a sequence number and to form the control data as shown in FIG. 5. In the illustrated example, the data retransmission request command (0×24) is transmitted at a step S102 as the control data. Namely, the command area and the RSN area of the data retransmission request command are given (0×24) and the previously received sequence number, respectively. Such a data retransmission request command is received by the network protocol portion 53b of the client terminal 31 at the step S102 and thereafter the information server is kept in a standby state, as shown by a step S103. During the standby state, the information server discards any data sent together with the data transmission command (0×04), as shown at a step S104.

Supplied with the data retransmission request command, the network protocol portion 53b retransmits the data from the frame which disappeared (step S105) and waits for the data response command (0×14) sent from the information server (step S70).

Figure 13:
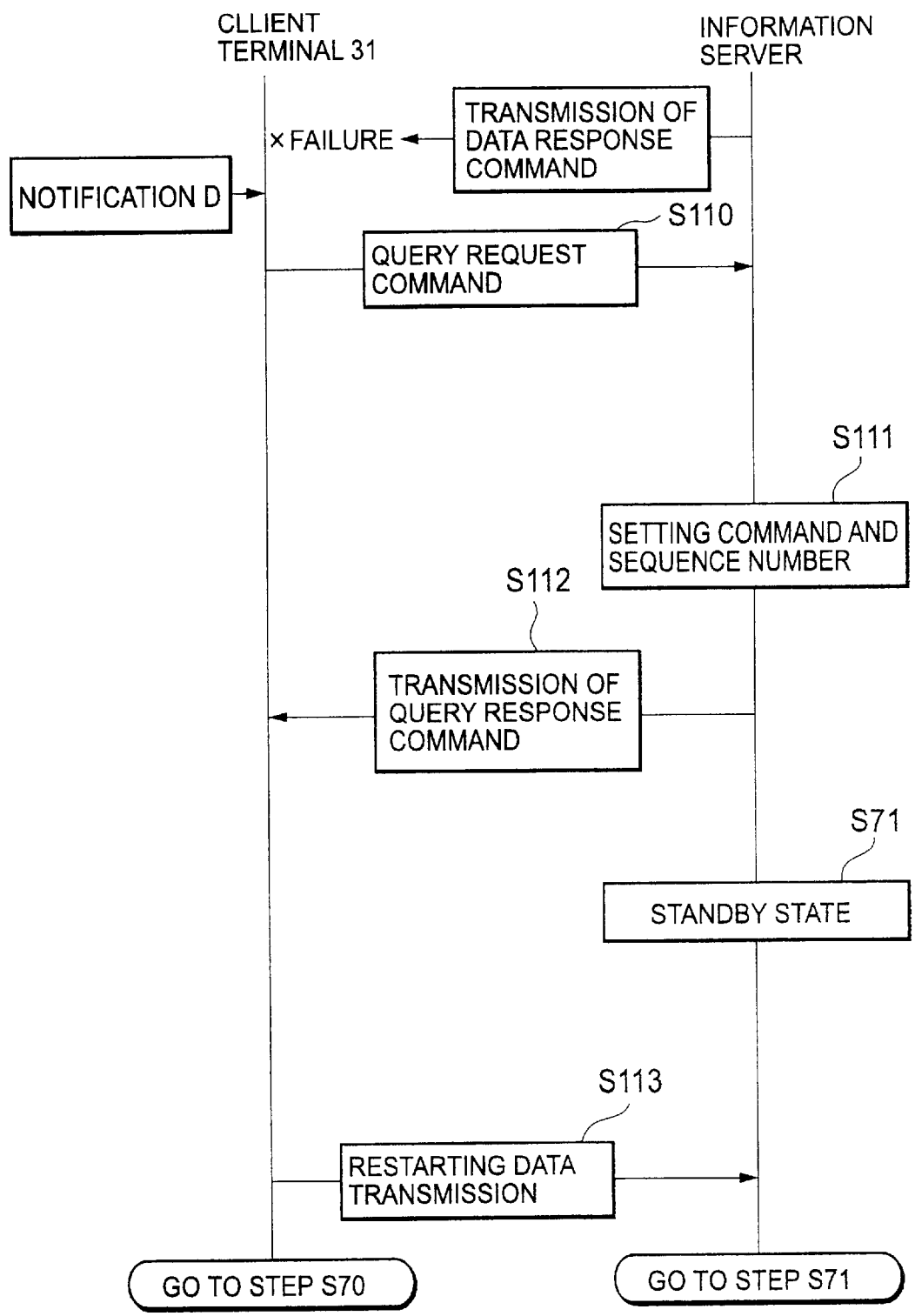
FIG. 13 shows a flow chart for use in describing operation carried out in the client terminal and the information server on occurrence of failure of a data response command sent from the information server.

Referring to FIG. 13, description will be made as regards the step S81 which is illustrated in FIG. 11 and which is carried out in the client terminal 31 when failure takes place in connection with the data response command sent from the information server. When the notification D is received from the clock device 54 before reception of the data response command, the network protocol portion 53b of the client terminal 31 transmits the query request command (0×08) at a step S110. Responsive to the query request command, the information server sets a command and a sequence number to form the control data. In this case, the command area is given the query response command (0×18) identifier while the RSN area is given a previously received data sequence number. Thus, the query response command (0×18) is formed and is transmitted from the information server to the network protocol portion 53b of the client terminal 31 (step S112). Thereafter, the information server is kept in the standby state, as shown at a step S71, to wait for the desired frame sent from the client terminal 31.

Supplied with the query response command, the network protocol portion 53b of the client terminal 31 transmits the data from a next frame indicated by the RSN value (step S113) to the information server and waits for the data transmission response command (0×14) sent from the information server (step S70).

Figure 14:
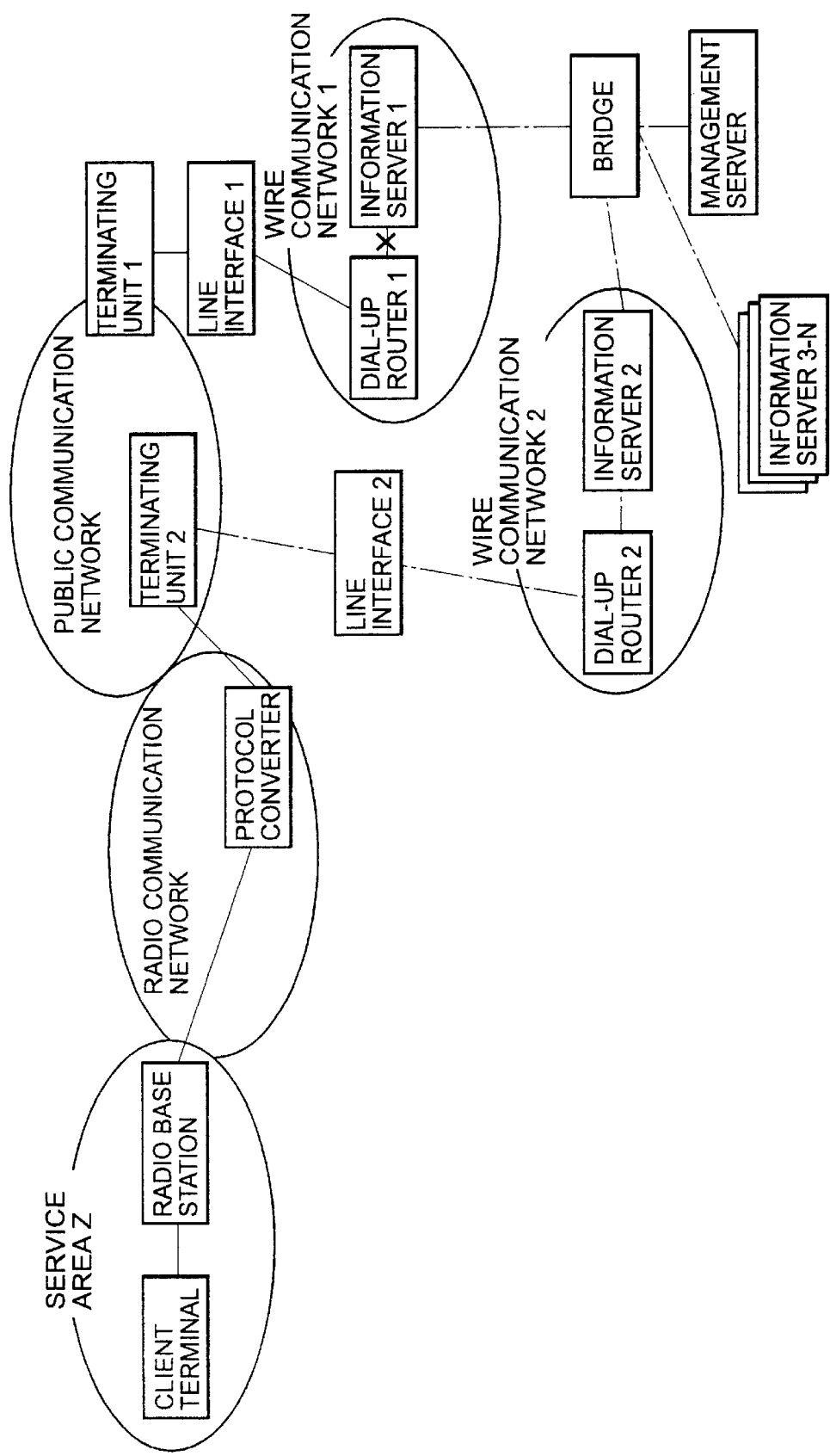
FIG. 14 shows a block diagram of the data communication system for use in describing a path which is formed between the client terminal and the information server prior to switching.
Figure 15:
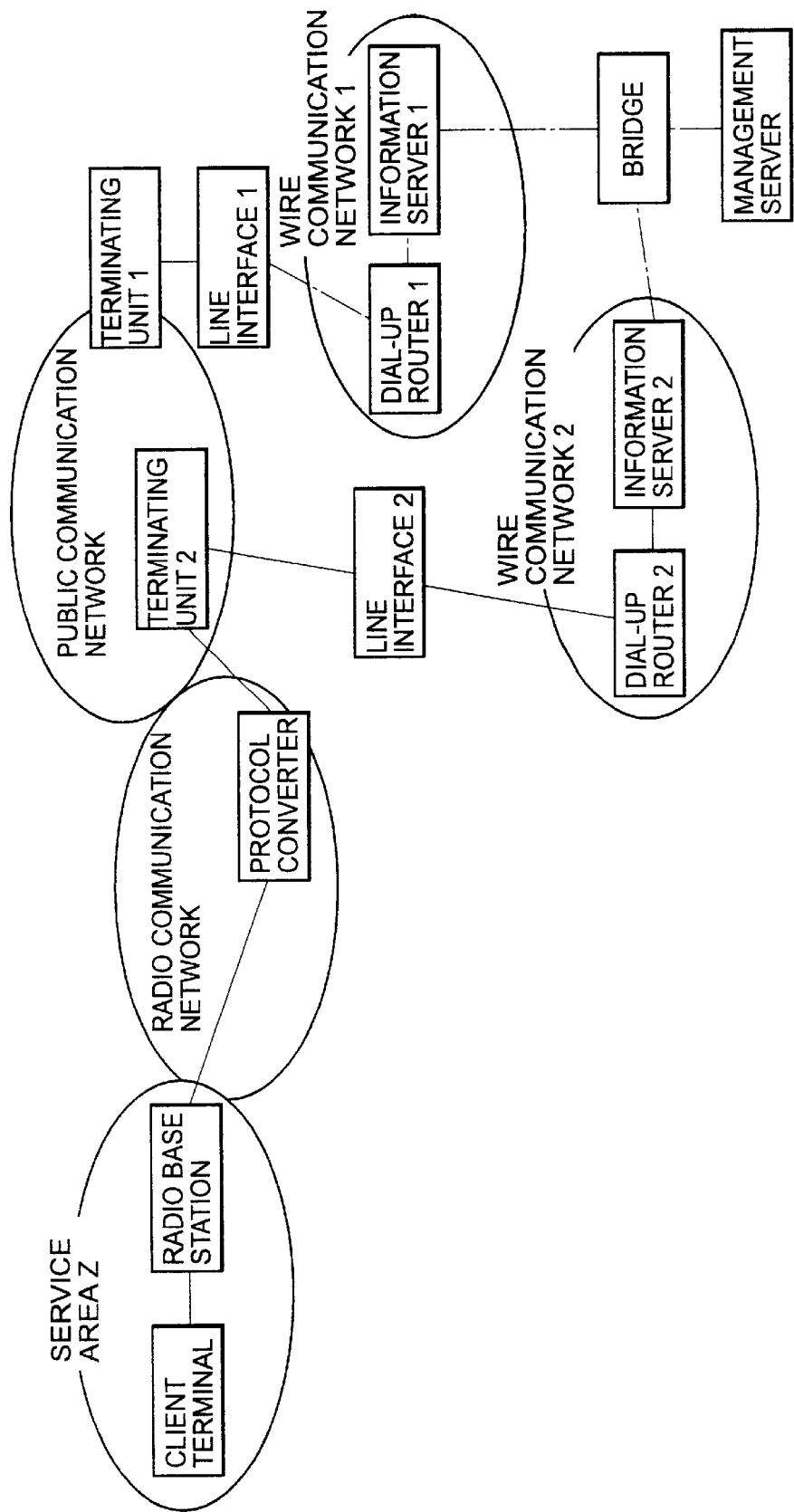
FIG. 15 shows a block diagram of the data communication system for use in describing a switched path between the client terminal and another information server.

Referring to FIGS. 14 and 15, operation according to this invention will be diagrammatically described which can switch from the current path to the other path. In FIG. 14, the current path is at first formed between the client terminal 31 and the information server 1 of the wire communication network. As a result, data communication is assumed to be carried out between the client terminal 31 and the information server 1, as depicted by a solid line in FIG. 14. Under the circumstances, it is surmised that the current path is judged to be switched to the other path or route between the client terminal 31 and the information server 2, as shown in FIG. 15. This means that, during the data transmission between the client terminal 31 and the information server 1, it is judged that a transmission time can be shortened when the current path or route is switched to the other path or route and the data transmission is carried out again from the initial data through the other switched path or route. As a result, the current or route is disconnected from the information server 1, as shown in FIG. 14 while the other switched path or route is afresh formed between the client terminal 31 and the information server 2, as shown in FIG. 15.

In this event, each information server manages the frequency of retransmission within the predetermined time interval and the number of the client terminals accessing each information server. The path or route number assigned to the switched destination and the throughput of the switched path or route are transmitted from the information server to the management server at the step S78 and are sent from the management server to the switched information server.

Each information server is registered in the management server on the installation of each information server and is thereafter communicable with the management server. Thus, management information is transmitted/received between each information server and the management server. Taking this into consideration, it is readily understood that the management server is operable in response to reception of the throughput information from a certain information server to investigate the other information server that is close to the certain information server and that has good throughput in comparison with the certain information server. Consequently, the management server informs the investigated other information server of the path or route number assigned to the investigated other information server and the throughput information.

Alternatively, the management server may notify each information server of the path or route number to be switched and the throughput information at a prescribed period.

Similar operation can be carried out by using a function of the radio data communication program included in each information server or by using the dial-up router which can execute operation similar to the network protocol portion.

In the illustrated example, description has been restricted to the method of switching the information servers both of which are connected to the public communication network from one to another. However, this invention may be applicable to a network system which switches the public communication networks from one to another when data failure takes place in a certain one of the public communication networks.

In this event, each information server informs the management server of a species of the public communication networks on the installation of each information server and calculates throughput of each network protocol. In addition, each information server notifies the management server of load information imposed on each information server. The management server monitors the load information of each information server when the throughput information is given from each information server to the management server. When a load represented by the load information is small, the management server informs each information server of continuously using the same public communication network. In addition, the management server also informs each information server of the path or route number of the other information server which is close to each information server and which has good throughput together with its throughput information.

On the other hand, when the load is large, the management server informs each information server of using another public communication network. Moreover, the management server also informs each information server of a path or route number and throughput of the other information server which is closer to each information server and which has good throughput.

In the illustrated example, the path or route is switched on the basis of the transmission time necessary until data transmission is completed. However, such switching paths may be determined in consideration of communication charges also. In this case, a user can select the path or route on the basis of the data transmission time or the communication charges. Specifically, the user issues a query about selecting either the data transmission time or the communication charges immediately before the communication application is started or data is transmitted. When the communication charges are selected by the user, a total data amount transmitted by using the current path or route is at first calculated within a unit data transmission time from a data amount already transmitted and retransmitted and a remaining data amount. In addition, an amount of the control data is added to the above-mentioned total data amount to obtain a whole data amount and judgement is made about whether or not the whole data amount is greater than an amount of information sent through the other path or route. If the whole data amount is greater than the amount of information sent through the other path, the current path is switched to the other path indicated by the information server.

Figure 16:
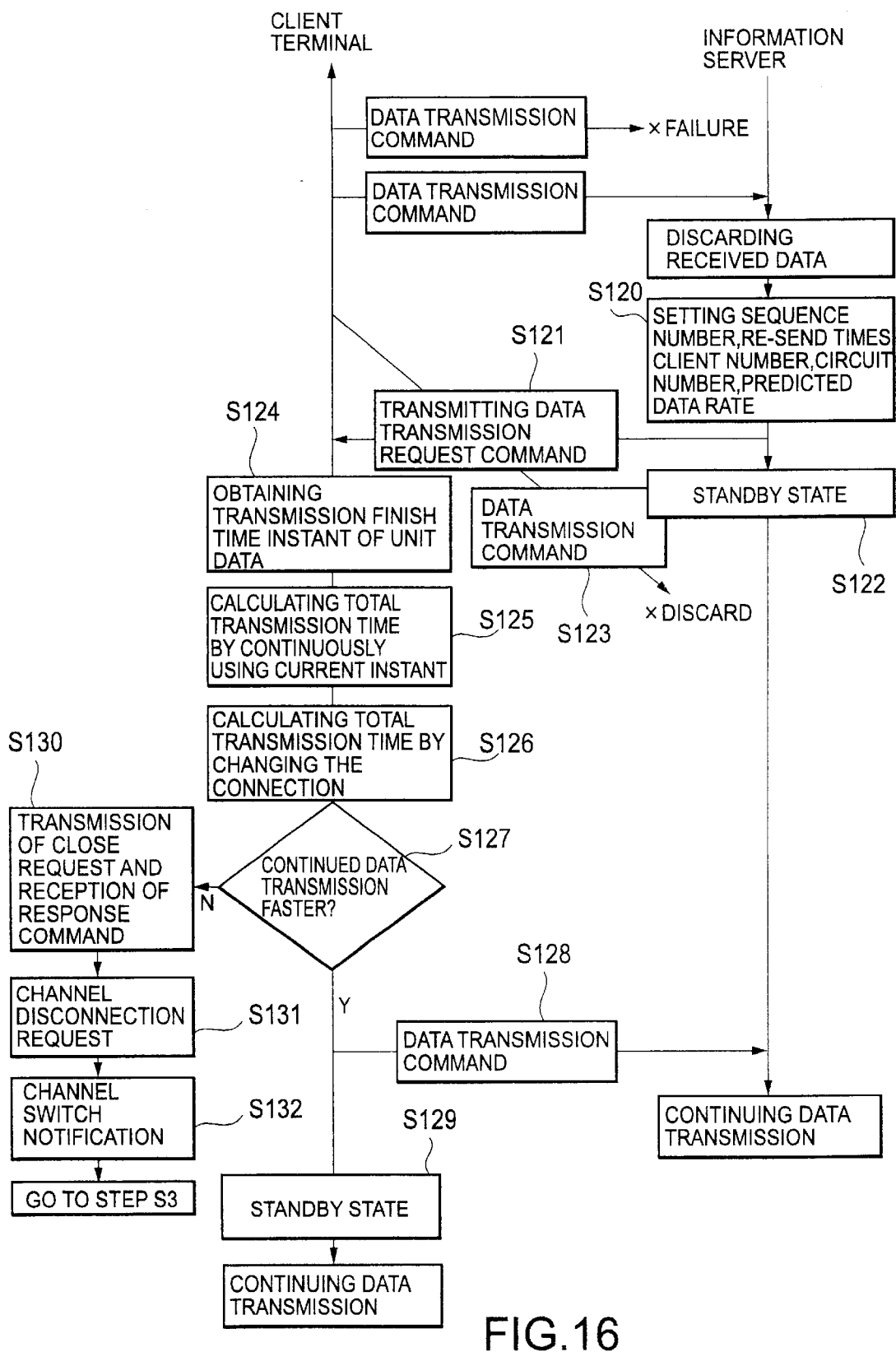
FIG. 16 shows a block diagram of a data communication system according to another embodiment of this invention.

Referring to FIG. 16, description will be made about operation which is carried out by a network system according to a second embodiment of this invention. It is to be noted that the network system illustrated in FIG. 16 is operable to switch the paths or routes from one to another at a time instant when the data transmission command sent from the client terminal 31 fails to be received by an information server, although judgement is made in the first embodiment about switching the paths at the time instant when the unit data negotiated during the connection establishment processing is completely transmitted.

More specifically, when the information server receives data from the client terminal 31 and detects that the data indicates an undesired frame, the received data is discarded by the information server. Instead, the information server forms, at a step S120, the control data which is structured by the sequencing number (RSN) of data already received, the frequency (re-send times) of retransmission occurring during a predetermined time interval, the number of the client terminals accessing the information server, the dial number to be switched, and the predicted data rate of the switched path. The sequence number, the frequency of the retransmission, the number of the client terminals, the dial number, and the predicted data rate may be arranged in the RSN area, the re-send times area, the access area, the dial number area, and the speed area all of which are illustrated in FIG. 5, respectively.

Thereafter, the information server transmits the data retransmission request command to the network protocol portion of the client terminal 31 (step S121) and is put into a standby state to wait for a desired data frame sent from the client terminal 31 (step S122). During this standby state, data received from the client terminal 31 is discarded by the information server (step S123).

On the other hand, the client terminal 31 receives the data retransmission request command by the network protocol portion thereof. The network protocol portion of the client terminal 31 obtains a transmission finish time instant of unit data from the clock device (step S124) and calculates a total transmission time from the unit data transmission time and a remaining amount of data (step S125). The calculated total transmission time is representative of a time which is necessary until continuous data transmission is completed by continuously using the current path or route now connected.

At a step S126, the network protocol portion also calculates an alternative transmission time from a connection time spent until completion of the connection, the transmission/reception data rate, and a whole amount of transmission data. The data rate is arranged in the speed area of the control data sent from the information server and is representative of a predicted value. On the other hand, the alternative transmission time is representative of a time which is necessary until switched data transmission of the whole data is finished through the switched path or route from the beginning of the data.

Under the circumstances, judgement is made about whether or not the continuous data transmission is faster than the switched data transmission at a step S127. If the continuous data transmission which uses the current path or route is faster than the switched data transmission which uses the switched path or route, the step S127 proceeds to a step S128 at which the data communication command is sent from the client terminal 31 to the information server. Thus, retransmission is started at the step S128 from a failure frame which is not received. Thereafter, the client terminal 31 is put into the standby state for waiting for the data response command (0×14) sent from the information server and continues data transmission in a manner similar to the above.

If it is judged at the step S127 that the continuous data transmission is slower than the switched data transmission, the step S127 is followed by a step S130 at which the close request command (0×02) is sent to the information server. When the close response command (0×12) is received from the information server at the step S130, a disconnection request is sent to the connection control portion 53c at a step S131 to indicate a disconnection of the radio channel. In this event, a notification which notifies the disconnection of the radio channel is sent as a channel switch notification from the connection control portion 53c to the communication application 531 (step S132). Responsive to the above-mentioned notification, the communication application 531 retries the connection processing in connection with a radio channel from the step S3 shown in FIG. 7.

While this invention has thus far been described in conjunction with a few embodiments thereof, it will readily be possible for those skilled in the art to put this invention into practice in various other manners. For example, the paths or routes for the PDC and the PHS may be switched from one to another.

What is claimed is:

1. A radio communication method of carrying out data communication comprising:

establishing a first path between a radio terminal and a first server to carry out the data communication;

measuring an amount of information left in the radio terminal at a predetermined time instant during the data communication after the first path is established; and determining in the radio terminal whether to switch the first path to a second path connected to a second server based on at least the amount of information left in the radio terminal at the predetermined time instant.

2. The method as claimed in claim 1, wherein the predetermined time instant is determined after a predetermined amount of information is transmitted through the first path established between the radio terminal and the first server.

3. The method as claimed in claim 1, wherein the predetermined time instant is determined after failure of the information is detected by the first server.

4. The method as claimed in claim 1, wherein the procedure for determining whether the first path is switched comprises:

receiving, by the radio terminal, alternative information regarding the second path from the first server;

calculating a transmission time for transmitting the amount of information left in the radio terminal through the first path;

calculating, on the basis of the alternative information, an alternative transmission time for transmitting all information in the radio terminal through the second path;

comparing the transmission time with the alternative transmission time; and selecting one of the first path and the second path that corresponds to the shorter one of the transmission time and the alternative transmission time.

5. The method as claimed in claim 4, further comprising:

disconnecting the first path from the radio terminal when the transmission time is not shorter than the alternative transmission time; and connecting the radio terminal to the second path to carry out the data communication through the second path.

6. The method as claimed in claim 4, wherein the alternative information regarding the second path received from the first server has a path number connected to the second server and throughput information of the second path.

7. The method as claimed in claim 6, wherein the throughput information of the second path includes a data rate of the second path.

8. The method as claimed in claim 6, further comprising:

connecting a management server to the first server and the second server;

managing the first server and the second server by the management server; and sending the path number and the throughput information from the management server to the radio terminal through the first server to enable the radio terminal to determine whether the first path is to be switched to the second path.

9. The method as claimed in claim 1, wherein the procedure for determining whether the first path is switched comprises;

receiving, by the radio terminal, alternative information regarding the second path from the first server;

calculating a communication fee for transmitting the amount of information left in the radio terminal through the first path;

calculating, on the basis of the alternative information, an alternative communication fee for transmitting all information in the radio terminal through the second path;

comparing the communication fee with the alternative communication fee; and selecting one of the first path and the second path that corresponds to the lower one of the communication fee and the alternative communication fee.

10. The method as claimed in claim 9, further comprising:

disconnecting the first path from the radio terminal when the communication fee is not lower than the alternative communication fee; and connecting the radio terminal to the second path to carry out the data communication through the second path.

11. The method as claimed in claim 9, wherein the alternative information regarding the second path received from the server has a path number connected to the second server and throughput information of the second path.

12. The method as claimed in claim 11, further comprising:

connecting a management server to the first server and the second server;

managing the first server and the second server by the management server; and sending the path number and the throughput information from the management server to the radio terminal through the first server to enable the radio terminal to determine whether the first path is to be switched to the second path.

13. The method as claimed in claim 1, wherein the procedure for determining whether the first path is switched comprises:

receiving, by the radio terminal, alternative information regarding the second path from the first server;

calculating a selected one of a transmission time and a communication fee for transmitting the amount of information left in the radio terminal through the first path;

calculating, on the basis of the alternative information, a selected one of an alternative transmission time and an alternative communication fee for transmitting all information in the radio terminal through the second path; and comparing the selected one of the transmission time and the communication fee with the selected one of the alternative transmission time and the alternative communication fee, respectively, to select one of the first path and the second path on the basis of a result of the comparison.

14. The method as claimed in claim 1, wherein the amount of information left in the radio terminal is measured at a plurality of predetermined time instants and determining whether to switch the first path to the second path is based on at least the amount of information left in the radio terminal at each respective time instant of the plurality of predetermined time instants.

15. A radio data communication system for use in carrying out data communication, the radio data communication system comprising:

establishing means for establishing a first path between the radio terminal and a first server to carry out the data communication;

measuring means for measuring an amount of information left in the radio terminal at a predetermined time instant during the data communication after the first path is established; and determining means for determining whether to switch the first path to a second path connected to a second server based on at least the amount of information left in the radio terminal at the predetermined time instant.

16. The radio data communication system as claimed in claim 15, wherein the determining means comprises:
   means for receiving alternative information regarding the second path from the first server;
   means for calculating a selected one of a transmission time and a communication fee for transmitting the amount of information left in the radio terminal through the first path;
   means for calculating, on the basis of the alternative information, a selected one of an alternative transmission time and an alternative communication fee for transmitting all the information on the radio terminal through the second path; and
   means for comparing the selected one of the transmission time and the communication fee with the selected one of the alternative transmission time and the alternative communication fee, respectively, to select one of the first path and the second path for the data communication.

17. The radio data communication system as claimed in claim 16, further comprising:
   a management server for managing the first server and the second server;
   the first server comprising;
      means for transmitting the alternative information to the radio terminal under control of the management server to enable the radio terminal to switch from the first path to the second path.

18. A radio terminal for use in carrying out data transmission comprising:
   establishing means for establishing a first path between a radio terminal and a first server to carry out the data communication;
   measuring means for measuring an amount of information left in the radio terminal at a predetermined time instant during the data communication after the first path is established; and
   determining means for determining whether to switch the first path to a second path connected to a second server based on at least the amount of information left in the radio terminal at the predetermined time instant.

19. The radio terminal as claimed in claim 18, wherein the determining means comprises:
   means for receiving alternative information regarding the second path from the first server;
   means for calculating a selected one of a transmission time and a communication fee for transmitting the amount of information left in the radio terminal through the first path;
   means for calculating, on the basis of the alternative information, a selected one of an alternative transmission time and an alternative communication fee for transmitting all information in the radio terminal through the second path; and
   means for comparing the selected one of the transmission time and the communication fee with the selected one of the alternative transmission time and the alternative communication fee, respectively, to select one of the first path and the second path for the data communication.

20. A radio data communication system for use in carrying out data communication, the radio data communication system comprising:

a first server;
a second server; and
a radio terminal, the radio terminal including:
   a connection interface that establishes a first communication path between the radio terminal and the first server to carry out the data communication; and
   a communication application that measures an amount of information left in the radio terminal at a predetermined time instant during the data communication after the first communication path is established and determines if the data communication is to be switched from the first communication path to a second communication path connected to the second server based on at least the amount of information left in the radio terminal at the predetermined time instant.

21. The radio data communication system according to claim 20, wherein the communication application measures the amount of information left in the radio terminal at a plurality of predetermined time instants and determines if the data communication is to be switched to the second communication path based on at least the amount of information left in the radio terminal at each respective time instant of the plurality of predetermined time instants.

22. The radio data communication system according to claim 20, wherein the communication application determines the predetermined time instant after a predetermined amount of information is transmitted through the first communication path established between the radio terminal and the first server.

23. The radio data communication system according to claim 20, wherein the communication application determines the predetermined time instant when a failure of the data communication is detected by the first server.

24. The radio data communication system according to claim 20, wherein:
   the connection interface receives alternative information regarding the second communication path from the first server; and
   the communication application calculates a transmission time for transmitting the amount of information left in the radio terminal through the first communication path, calculates an alternative transmission time for transmitting all the information in the radio terminal through the second path based on the alternative information, and compares the transmission time with the alternative transmission time to select one of the first communication path and the second communication path for carrying out the data communication.

25. The radio data communication system according to claim 24, further comprising a management server for managing the operations of the first server and the second server, wherein the first server includes a communication interface that transmits the alternative information to the radio terminal under control of the management server to enable the radio terminal to switch from the first communication path to the second communication path.

26. The radio data communication system according to claim 20, wherein:
   the connection interface receives alternative information regarding the second communication path from the first server; and
   the communication application calculates a communication fee for transmitting the amount of information left in the radio terminal through the first communication path, calculates an alternative communication fee for transmitting all the information in the radio terminal through the second path based on the alternative information, and compares the communication fee with the alternative communication fee to select one of the first communication path and the second communication path for carrying out the data communication.

27. The radio data communication system according to claim 26, further comprising a management server for managing the operations of the first server and the second server, wherein the first server includes a communication interface that transmits the alternative information to the radio terminal under control of the management server to enable the radio terminal to switch from the first communication path to the second communication path.

28. A radio terminal for carrying out data transmission, the radio terminal comprising:
   a connection interface that establishes a first communication path between the radio terminal and a first server to carry out the data communication; and
   A communication application that measures an amount of information left in the radio terminal at a predetermined time instant during the data communication after the first communication path is established and determines if the data communication is to be switched from the first communication path to a second communication path connected to a second server based on at least the amount of information left in the radio terminal at the predetermined time instant.

29. The radio terminal according to claim 28, wherein the communication application measures the amount of information left in the radio terminal at a plurality of predetermined time instants and determines if the data communication is to be switched to the second communication path based on at least the amount of information left in the radio terminal at each respective time instant of the plurality of predetermined time instants.

30. The radio terminal according to claim 28, wherein the communication application determines the predetermined time instant after a predetermined amount of information is transmitted through the first communication path established between the radio terminal and the first server.

31. The radio terminal according to claim 28, wherein the communication application determines the predetermined time instant when a failure of the data communication is detected by the first server.

32. The radio terminal according to claim 28, wherein:
   the connection interface receives alternative information regarding the second communication path from the first server; and
   the communication application calculates a transmission time for transmitting the amount of information left in the radio terminal through the first communication path, calculates an alternative transmission time for transmitting all the information in the radio terminal through the second path based on the alternative information, and compares the transmission time with the alternative transmission time to select one of the first communication path and the second communication path for carrying out the data communication.

33. The radio terminal according to claim 28, wherein:
   the connection interface receives alternative information regarding the second communication path from the first server; and
   the communication application calculates a communication fee for transmitting the amount of information left in the radio terminal through the first communication path, calculates an alternative communication fee for transmitting all the information in the radio terminal through the second path based on the alternative information, and compares the communication fee with the alternative communication fee to select one of the first communication path and the second communication path for carrying out the data communication.

* * * * *